United States Patent [19]
Mouri et al.

[11] Patent Number: 5,147,477
[45] Date of Patent: Sep. 15, 1992

[54] PNEUMATIC TIRE HAVING FOAMED TREAD RUBBER

[75] Inventors: Hiroshi Mouri; Yasuyoshi Kawaguchi; Michio Ishii; Seiichiro Iwafune; Toshiro Iwata, all of Tokyo, Japan

[73] Assignee: Bridgestone Corporation, Tokyo, Japan

[21] Appl. No.: 527,706

[22] Filed: May 24, 1990

Related U.S. Application Data

[63] Continuation of Ser. No. 307,219, Feb. 6, 1989, abandoned, which is a continuation of Ser. No. 9,367, Jan. 30, 1987, abandoned.

[30] Foreign Application Priority Data

| Feb. 5, 1986 | [JP] | Japan | 61-24634 |
| Apr. 2, 1986 | [JP] | Japan | 61-77081 |
| Oct. 2, 1986 | [JP] | Japan | 61-235921 |
| Oct. 2, 1986 | [JP] | Japan | 61-235923 |

[51] Int. Cl.⁵ ............................................. B60C 11/00
[52] U.S. Cl. ............................................. 152/209 R
[58] Field of Search ...................... 152/209 R, 209 D

[56] References Cited

U.S. PATENT DOCUMENTS

| 396,743 | 8/1983 | Fujimaki et al. | 152/209 R |
| 4,163,467 | 8/1979 | Dobson | 152/347 |
| 4,249,588 | 2/1981 | Egan | 152/357 R |
| 4,282,052 | 8/1981 | Dobson | 156/79 |
| 4,385,653 | 5/1983 | Okazaki et al. | 152/209 R |
| 4,640,952 | 2/1987 | Takisuchi et al. | 152/209 R |
| 4,833,191 | 5/1989 | Bushway et al. | 524/473 |

FOREIGN PATENT DOCUMENTS

| 39240 | 11/1981 | European Pat. Off. |
| 175534 | 3/1986 | European Pat. Off. |
| 2362627 | 6/1975 | Fed. Rep. of Germany ... 152/209 R |
| 31-3913 | 3/1956 | Japan . |
| 40-4641 | 12/1965 | Japan . |
| 56-154304 | 11/1981 | Japan . |
| 62-28001 | 6/1987 | Japan . |
| 2134049 | 8/1984 | United Kingdom . |

OTHER PUBLICATIONS

Dr. G. Fromandi, et al., "Traction influence of the mixing temperatures to the mechanical attribute of the qualities of the caps of tires", Kautschuk und Gummi, Jan. 10, 1954, pp. 212–217.

*Primary Examiner*—Geofrey L. Knable
*Attorney, Agent, or Firm*—Foley & Lardner

[57] ABSTRACT

Herein disclosed is a pneumatic tire which comprises a case and a tread which covers a crown portion of the case. The tread includes a foamed rubber which has a volume not less than 10% of that of the entire of the tread, and the foamed rubber is formed of a rubber composition which contains rubber components each having a glass transition point not higher than −60° C.

17 Claims, 6 Drawing Sheets

R-I : REFERENCE I
R-II : REFERENCE II
E-I : EXAMPLE I
E-II : EXAMPLE II
E-III : EXAMPLE III
E-IV : EXAMPLE IV
E-V : EXAMPLE V

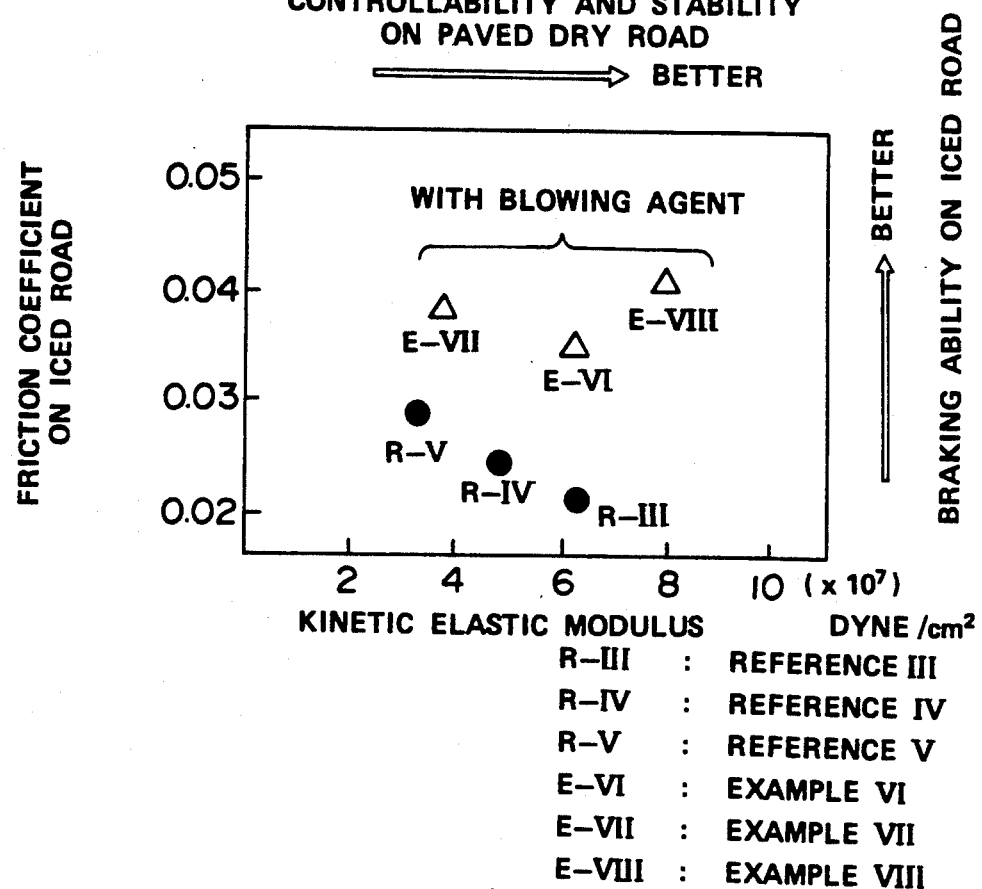
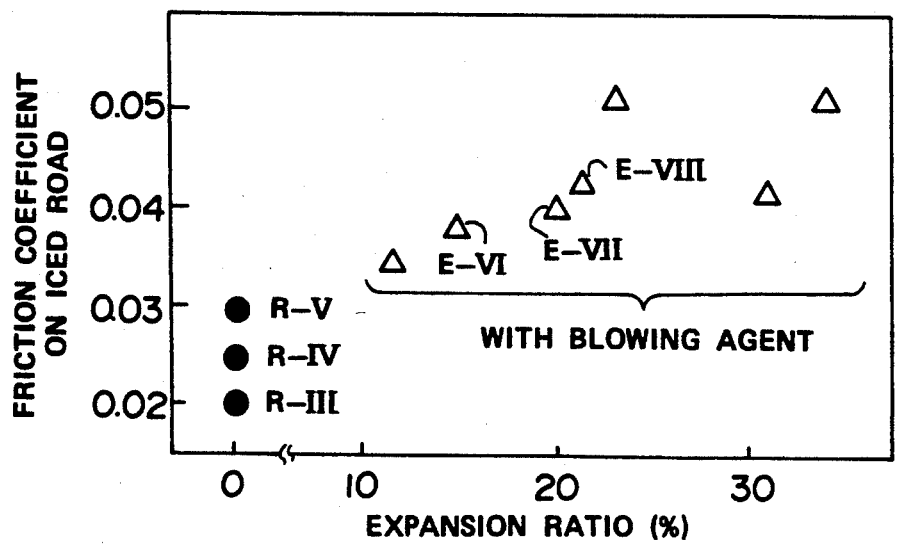

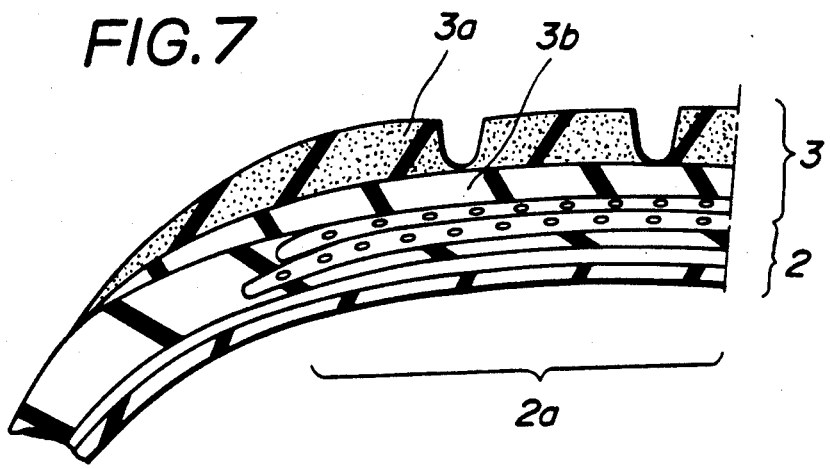
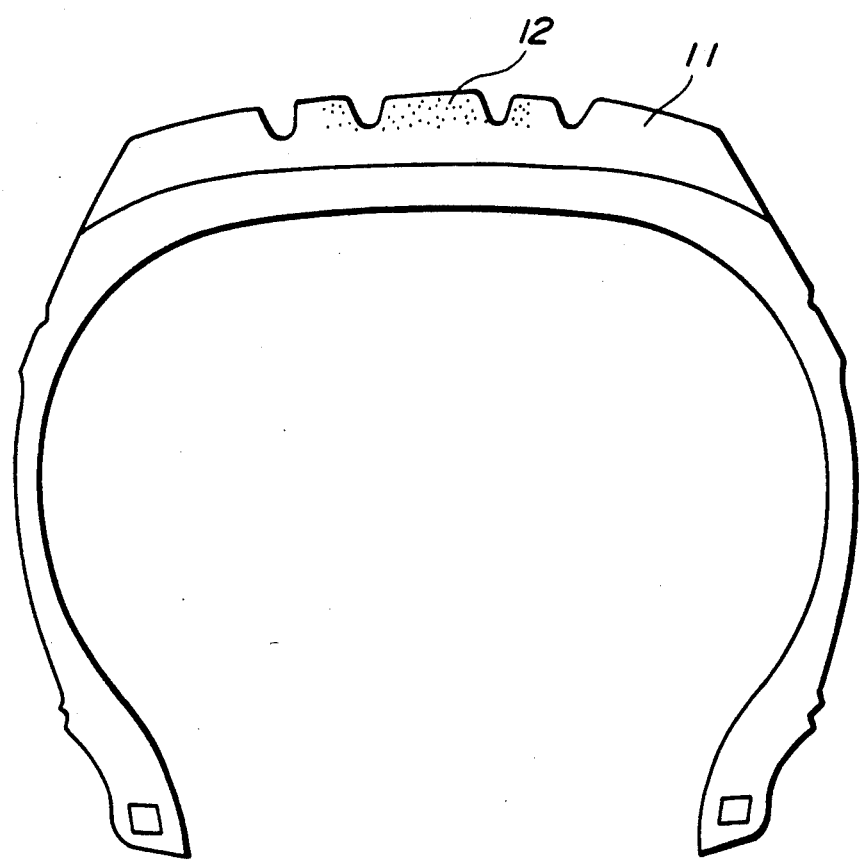

5,147,477

PNEUMATIC TIRE HAVING FOAMED TREAD RUBBER

This application is a continuation of application Ser. No. 07/307,219, filed Feb. 6, 1989, now abandoned, which is a continuation of Ser. No. 07/009,367filed Jan. 30, 1987 now abandoned.

BACKGROUND OF THE INVENTION

1. Field of the Invention

The present invention relates in general to a pneumatic tire and more particularly to a pneumatic tire which is designed to provide not only good controllability, stability and wear resistability particularly in summer but also improved traction and braking abilities on snow or iced road surface in winter.

2. Description of the Prior Art

In order to improve the traction and braking abilities and controllability (hereinafter, which will be referred to "snow gripping ability") of tires to snow or iced road surface, spiked tires have been hitherto proposed and practically put in use. However, wear of the spikes of the tires and wear of the road surfaces resulting from scratching by the spikes have caused a severe social problem, viz., the dust pollution.

In the meantime, in the tires of a studless type which has no spike pins mounted on the tires, various attempts have been made to the shape of the tread pattern and the material of the tread for the purpose of improving the snow gripping ability of the tire. However, it has been impossible to increase the snow gripping ability to the level of the spiked tire. In fact, using a low glass transition point polymer as a material of the tread and using a low melting point softening agent as an additive of the rubber composition have been taken into consideration for assuring satisfactory friction between the tread and the road surface at low temperature. However, this method brings about a deterioration of the snow gripping ability of the tread.

Furthermore, tires which use foamed rubber as a material of the tread have been proposed by Japanese Patent Second Provisional Publication 40-4641, U.S. Pat. No. 4,249,588 and Japanese Patent Second Provisional Publication No. 56-154304. In case of the 40-4641 Publication, synthetic rubbers, such as high styrene-rubber, of the type which has a considerable hysteresis loss are used for the tread. However, using such rubber components increases the glass transition point of the tread rubber and thus increases the hardness of the same at a lower temperature thereby deteriorating the snow gripping ability of the tread. In case of the U.S. Pat. No. 4,249,588 Publication, a rubber having a compressibility in the range of about 1 to 800 psi at 50% compression at 25° C. is used as a material of the tread. However, it is generally said that a desired control responsibility of the tread is obtained only when the tread has at least 400 psi. Furthermore, in case of the 56-154304 Publication, foamed rubber having a considerable hardness is used in place of solid rubber for the purpose of reducing the weight of the tire. However, as is known, satisfactory snow gripping ability can not be obtained from such hardened tread.

In addition to the above, an attempt of mixing regular additives, such as sand, carborundum grain and metal grain, to the rubber composition for the tread has been hitherto made for the purpose of improving the snow gripping ability. However, this attempt has brought about deterioration of the wear resisting ability of the tread.

Furthermore, an attempt at reducing the hardness of the rubber of the tread has been also made for the purpose of improving the braking ability of the tread on iced road surface. That is, in order to achieve this, reduction of reinforcing agents, reduction of vulcanization density and increase of softener and oil have been employed. However, as is well known to those skilled in the art, the reduction of the reinforcing agents brings about a deterioration of the braking ability of the tread on wet road surface, the reduction of the vulcanization density brings about a considerable permanent set of the rubber and the increase of the amounts of softener and oil brings about a great change in hardness of the rubber during use of the same.

SUMMARY OF THE INVENTION

It is therefore an object of the present invention to provide an improved pneumatic tire which is free of the above-mentioned drawbacks.

According to the present invention, there is provided a pneumatic tire which assures not only snow gripping ability, wear resisting ability, controllability and heat resisting ability but also friction between the tread and iced road surface.

According to the present invention, there is provided a pneumatic tire which comprises a case and a tread covering a crown portion of the case, wherein the tread includes a foamed rubber having a volume not less than 10% of that of the entire of the tread, and wherein the foamed rubber is formed of a rubber composition which contains rubber components each having a glass transition point not higher than −60° C.

In order to solve the above-mentioned drawbacks encountered in the conventional pneumatic tires, the applicants have carried out various examinations and tests and finally discovered important facts, which will be summarized in the following.

That is, when a low glass transition point polymer is used as a material of the tread and a closed cell structure is involved in the rubber of the tread, the hardness of the tread (viz., the composite body consisting of the solid part of the rubber and foamed part of same) can be reduced to a suitable level without sacrificing vulcanization density of the rubber of the tread. Furthermore, usage of a small amount of softening agent together with foaming agent controls the kinetic elastic modulus of the produced tread as well as the internal loss of the same, so that hardness change of the tread rubber which would occur during practical usage of the tread can be reduced. This induces an increase in friction between the tread and wet-iced road surface, so that the braking, traction and cornering abilities of the associated tire are increased.

The present invention is provided by taking the above-mentioned facts into consideration and provides a pneumatic tire which has an improved tread disposed about a crown portion of a case portion of the tire. The tread has at least at its outer surface portion a foamed rubber layer which has a volume not less than 10% of that of the entire construction of the tread. The foamed rubber layer has an expansion ratio ranging from about 5% to about 50% and includes closed cells the mean cell diameter of which ranges from about 5 μm to about 150 μm. The foamed rubber is further characterized in that not less than 20 closed cells of diameters of about 30 μm to 200 μm are involved per 1 mm² or the foamed rubber. Preferably, the foamed rubber has a kinetic elastic modulus ranging from about $3 \times 10^7$ dyne/cm$^2$ to about $13 \times 10^7$ dyne/cm$^2$. If the kinetic elastic modulus is less than $3 \times 10^7$ dyne/cm$^2$, it is difficult to provide a satisfactory controllability of the tire in summer, and if the modulus is greater than $13 \times 10^7$ dyne/cm$^2$, the snow gripping ability of the tire is considerably lowered. The tread comprises a rubber composition of polymer which has a glass transition point not higher than $-60°$ C. For example, natural rubber, polyisoprene rubber, polybutadiene rubber, butyl rubber and butadiene/styrene rubber are used as the material of the tread in a single form or mixed form. Using such polymer or polymers brings about a sufficient elasticity of the tread even in a low temperature condition. Preferably, the rubber composition of the tread contains at least 20% cis-1-4-polybutadiene rubber by weight. The foamed rubber layer has a volume not less than 10% of that of the entire of the tread, preferably about 10% to 70%, and more preferably about 40% to 70% percent of that of the tread. If the volume of the foamed rubber layer is less than 10% of that of the tread, the snow gripping ability of the tread becomes inferior.

If desired, the entire of the tread may be constructed of a foamed rubber (viz., 100 percent foamed rubber tread).

Usually, the expansion ratio (Vs) is represented by the following equation.

$$Vs = \{(\rho_0 - \rho_g)/(\rho_1 - \rho_g) - 1\} \times 100 \; (\%) \quad (1)$$

wherein:

$\rho_1$ is the density (g/cm$^3$) of the foamed rubber;

$\rho_0$ is the density (g/cm$^3$) of a solid part of the foamed rubber; and $\rho_g$ is the density (g/cm$^3$) of a gas contained in the foams of the foamed rubber.

Because the value of $\rho_g$ is negligibly small as compared with that of $\rho_1$, the above-carried equation "(1)" can be replaced with the following equation.

$$Vs = (\rho_0/\rho_1 - 1) \times 100(\%) \quad (2)$$

In the invention, the expansion ratio Vs is about 5% to about 50%, preferably about 5% to about 30%. If the expansion ratio (Vs) is less than 5%, the flexibility of the foamed rubber is deteriorated greatly in a low temperature condition, and if the expansion ratio (Vs) exceeds 50%, the wear resistance of the tread to dry road surface is considerably lowered.

Furthermore, if desired, the tread may be comprised of a solid rubber inner layer and a foamed rubber outer layer. In this case, the solid rubber inner layer has a hardness not less than 50 degrees specified by JIS (Japanese Industrial Standard), preferably from 50 degrees to 70 degrees.

Furthermore, if desired, as is seen from FIG. 8, the foamed rubber may be applied to only the center portion of the tread. Furthermore, the foamed rubber may be partially applied to the tread as may be seen from FIGS. 9, 10 and 11.

The mean cell diameter of the closed cells in the foamed rubber is about 5 $\mu$m to about 150 $\mu$m, preferably from 10 $\mu$m to 100 $\mu$m. If the mean cell diameter is less than 5 $\mu$m, the snow gripping ability becomes inferior, and if the mean cell diameter exceeds 150 $\mu$m, the wear resistance of the foamed rubber tread is considerably reduced and the permanent set of the same is increased, so that long time usage of the tire on iced road surface tends to induce a considerable deformation of the tread thereby deteriorating the snow gripping ability of the same. Furthermore, with the mean cell diameter larger than 150 $\mu$m, the tread tends to chip off, and the tread becomes inferior in formability at the time when the tire is being produced.

In the present invention, at least 20 closed cells of diameters of about 30 $\mu$m to 200 $\mu$m, preferably, more than 30 cells, are involved per 1 mm$^2$. If the number of the cells per 1 mm$^2$ is less than 20, the roughness of the tread surface becomes insufficient to exhibit a satisfactory snow gripping ability of the tread.

The foamed rubber for the tire tread is produced by a known method wherein a rubber composition added with a blowing agent is heated and pressed. As the blowing agent, azodicarbonamide, dinitrosopentamethylenetetramine, azobisisobutyronitrile, benzensulfonylhydrazide and plastic microcapsule of high boiling point hydrocarbon compound are usable.

It is preferable that the foamed rubber contains 2 to 20 parts by weight of low temperature softening agent per 100 parts by weight of the rubber component. With this, it becomes possible to control the kinetic elastic modulus of the foamed rubber and the internal loss of the same, and thus, friction of the tread to iced road surface is improved. As the low temperature softening agent, dioctyladipate (DOA), dioctylphthalate (DOP), dioctylsebacate (DOS), diheptylphthalate (DHP), diethylphthalate (DEP), dioctylabilate (DOZ), dibutylmaleate (DBM), tributylphosphate (TBP) and trioctylphosphate (TOP) are usable, which have a freezing point not higher than $-40°$ C.

It is further preferable to mix a given amount of short fiber in the foamed rubber composition. In fact, upon blowing of the blowing agent, the short fiber in the rubber composition is forced to scatter in various directions. This scattered orientation of the short fiber improves the performance of the tire tread as will be described in the following.

That is, it has been revealed that by the addition of the short fiber, the elastic modulus of the tread is increased thereby to enhance controllability, viz., a side force resistance of the associated tire.

Furthermore, due to the provision of both the short fiber and the closed cells, the tread surface tends to have a suitable roughness, so that the friction coefficient of the tread surface relative to the wet or iced road surface is increased thereby improving the road gripping ability of the tire. Preferably, the short fiber used in the invention has a mean length of about 10 $\mu$m to about 500 $\mu$m, and has a length about 10 to about 100 times as large as the diameter of the fiber.

As the short fiber, organic and inorganic materials may be used, which are for example, the organic fiber made of aromatic polyamide, vinylon, polyester, nylon, viscose rayon, syn-1-2-polybutadiene or polyoxymethylene whisker, and the inorganic fiber made of glass, carbon, graphite, metal, silicone-carbide whisker, tungsten-carbide whisker or alumina whisker.

BRIEF DESCRIPTION OF THE DRAWINGS

Objects and advantages of the present invention will become apparent from the following description when taken in conjunction with the accompanying drawings, in which:

FIG. 3 is a graph showing performances of sample tires of the present invention in terms of a relationship between the friction coefficient on iced road surface and the kinetic elastic modulus of the tread;

FIG. 4 is a graph similar to FIG. 3, but showing a relationship between the friction coefficient on iced road surface and the expansion ratio;

FIG. 7 is a partial, sectional and schematic view of a pneumatic tire of the invention, which has a double layered tread;

FIG. 8 is a sectional view of a pneumatic tire having a tread which has a foamed rubber part at the center portion thereof.

DETAILED DESCRIPTION OF THE INVENTION

In the following, embodiments of the present invention will be described in detail with reference to the attached drawings.

Figure 1:
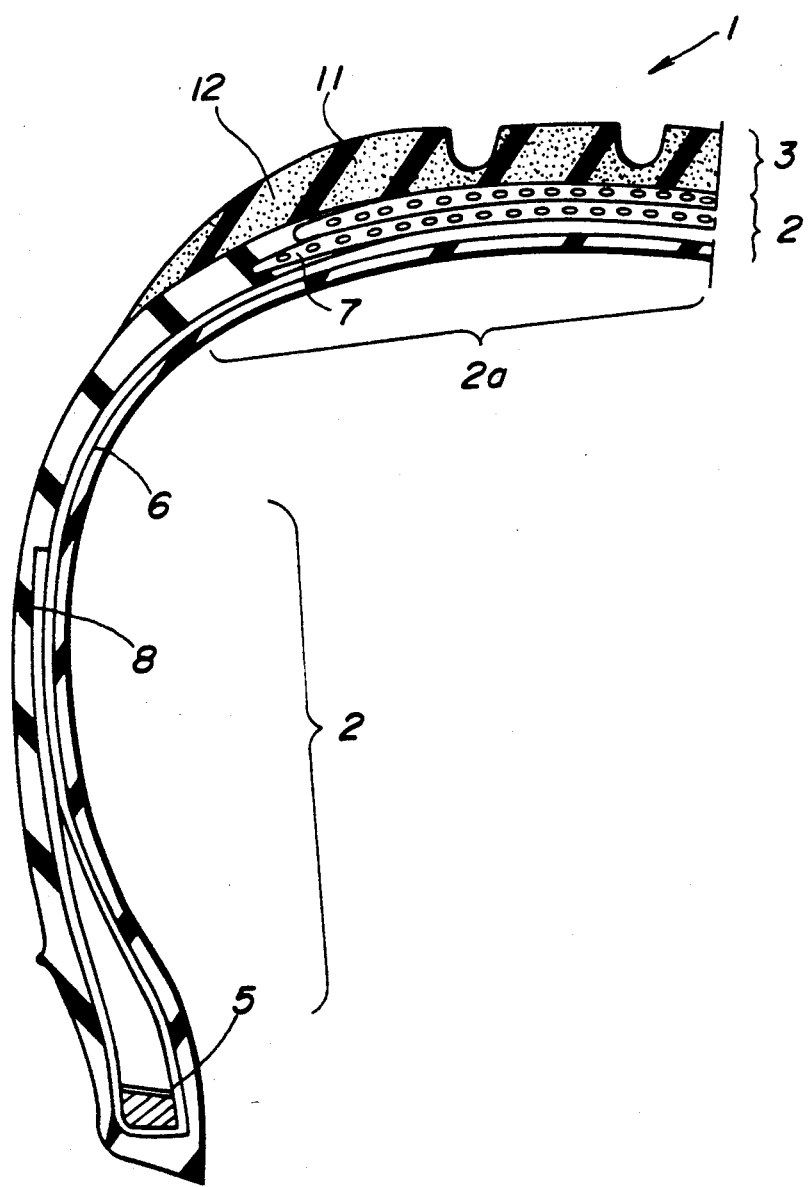
FIG. 1 is a partial, sectional and schematic view of a pneumatic tire according to the present invention.

Referring to FIG. 1, there is shown but partially a pneumatic tire of a first embodiment of the present invention. The tire 1 comprises generally a case 2 and a tread 3 which covers a crown portion 2a of the case 2. The tread 3 is constructed of the improved foamed rubber. The case 2 comprises a pair of beads 5 (only one is shown), a carcass 6 made up of layers of cord materials, belts 7 disposed on the circumstance of the crown portion 2a under the tread 3 and a pair of side walls 8 (only one is shown).

The tread 3 has at its outer side section a foamed rubber layer 11. The foamed rubber layer 11 has a volume not less than 10% of that of the entire of the tread 3, and in this embodiment shown in FIG. 1, the foamed rubber layer 11 forms the entire of the tread 3. Denoted by numeral 12 is the closed cell structure formed in the tread 3 of the embodiment.

The foamed rubber for the layer 11 of the embodiment is constructed of the rubber composition of "N-3" shown in TABLE 1. As is seen from this table, the rubber composition of "N-3" contains natural rubber and polybutadiene rubber which have glass transition points not higher than −60° C., known additives and blowing agent. As will become apparent as the description proceeds, the rubber compositions "N-1" and "N-2" fail to produce a tread having the improved tire performance according to the present invention, while the compositions "N-3" to "N-7" can produce the improved tread according to the invention.

TABLE 1

| No. of Tread Rubber Composition | (parts by weight) | | | | | | |
|---|---|---|---|---|---|---|---|
| | N-1 | N-2 | N-3 | N-4 | N-5 | N-6 | N-7 |
| Natural Rubber (glass transition point = −72° C.) | 70 | 70 | 70 | 70 | 70 | 70 | 70 |
| Polybutadiene Rubber (glass transition point = −100° C.) | 30 | 30 | 30 | 30 | 30 | 30 | 40 |
| Carbon Black | 75 | 80 | 75 | 75 | 75 | 75 | 70 |
| Process Oil | 30 | 25 | 35 | 30 | 30 | 30 | 30 |
| Wax | 1.0 | 1.0 | 1.0 | 1.0 | 1.0 | 1.0 | 1.0 |
| Stearic Acid | 3.0 | 3.0 | 3.0 | 3.0 | 3.0 | 3.0 | 3.0 |
| Antioxidant | 1.0 | 1.0 | 1.0 | 1.0 | 1.0 | 1.0 | 1.0 |
| Zinc Oxide | 3.0 | 3.0 | 3.0 | 3.0 | 3.0 | 3.0 | 3.0 |
| Vulcanization Accelerator | 0.5 | 0.5 | 0.5 | 0.5 | 0.5 | 0.5 | 0.5 |
| Sulfer | 2.0 | 2.0 | 2.0 | 2.0 | 2.0 | 2.0 | 1.5 |
| Blowing Agent | | | | | | | |
| Dinitroso-Pentamethylene-Tetramine | 1.0 | 1.5 | 1.8 | 2.2 | 2.5 | 3.2 | 2.0 |
| Urea | 1.0 | 1.5 | 1.8 | 2.2 | 2.5 | 3.2 | 2.0 |

PREPARATION OF TIRES FOR TEST

In order to examine the performance of the tire according to the present invention, sample tires classified as 165 SR 13 were produced through a known tire production method wherein the tread was built as a solid, unvulcanized layer onto the outer portion of the green, unvulcanized tire (viz., crown portion of the case), generally over a building drum, and the constructed tire was then shaped, molded, heated and vulcanized under pressure. During the vulcanization process, the closed cell structure itself was formed within the tread by head activation of the blowing agent contained in the rubber composition of the tread.

EVALUATION TESTS

The sample tires prepared in the above-mentioned manner were subjected to the following evaluation tests.

1. Mean Cell Diameter and Expansion Ratio

A tread of each sample tire was dissected to take out a test piece. The section of the test piece was photographed through a microscope with 100 to 400 multiplication, and the diameters of over 200 closed cells were measured. The measured diameters were averaged to provide the mean cell diameter. The expansion ratio of the tread was calculated by using the afore-mentioned equation "(2)". For this, a solid rubber was produced from the same rubber composition without using the blowing agent.

2. Number of Closed Cells of given diameters per 1 mm²

A microscope photograph was prepared in the above-mentioned manner and the number of the closed cells of diameter ranging from 30 μm to 200 μm was measured in a given area (over 4 mm²). From the number thus measured, number of Closed Cells of the given diameters per 1 mm² was calculated.

3. Roughness of the Tread Surface and Friction Coefficient of the Tread Surface to Iced road The roughness of the tread surface was measured by using a surface roughness tester specified by JIS (Japanese Industrial Standard) B0601 in which root means square (RMS) was used for evaluation of the roughness. Ten test pieces were cut out of each sample tire, each piece having a size of 10 mm in length, 10 mm in width and 5 mm in thickness. Each piece was subjected to the surface roughness measurement by using a needle type surface roughness tester produced by Kosaka Kenkyusho Co., Ltd. Ten surface portions of each test piece were measured at intervals of 0.5 mm under the condition wherein the radius (R) of the contact point of the needle was 2 μm, the biasing force was 0.7 mN and the length of scanning was 2.5 mm. The 100 data thus provided were averaged to provide the roughness evaluation of the tread surface.

The Friction Coefficient of the tread surface to Iced Road was measured by using a kinetic-statical friction tester produced by Kyowa Kaimenkagaku Co., Ltd. The measurement was carried out on the above-mentioned ten test pieces under the condition wherein the outer surface of each test piece was in contact with ice of about −0.5° C., the biasing load was 2 kg/cm², the sliding speed was 10 mm/sec and the ambient temperature was −2° C. The data were averaged.

4. Kinetic Elastic Modulus and Internal Loss

Several test pieces were cut out of the tread of each sample tire, each piece having a size of 30 mm in length, 4.6 mm in width and 2 mm in thickness. The test pieces were measured by a kinetic elastic modulus tester of Iwamoto Siesakujo Co., Ltd. under the condition wherein the ambient temperature was 30° C., and the frequency was 60 Hz and the amplitude was 1%.

5. Heat generation in Tread

Each sample tire was run on a motor-driven drum at a constant speed of 100 km/hr under a normal load for 3 hours. The temperature at the center portion of the tread was measured.

6. Wear Resistance

The sample tires were connected to a drive shaft of a 1500 cc motor vehicle. After the vehicle ran on a test course at a certain speed for a certain time, the depth of each groove of the tire tread pattern was measured. The results were converted into index on the basis of 100 for a reference tire. It is to be noted that the wear resistance increases as the index increases.

7. Braking Ability on Iced Road

The sample tires were connected to a 1500 cc motor vehicle, and run on an iced road at temperature of −5° C. The braking distance of the vehicle was measured on each group of sample tires. The results were converted into index on the basis of 100 for a reference tire. It is to be noted that the braking ability increases as the index decreases.

8. Controllability and Stability on Paved Dry Road

The Sample tires of each group were connected to the motor vehicle and run on a usual paved road in summer at a given speed. The driver evaluated the controllability and stability of the tested tires by feeling using a ten gradation method. The results were averaged and represented by "+" and "−" with respect to the result of a Reference. It is to be noted that "+" represents "good", while "−" represents "poor".

9. Hardness and Tensile Stress at 50% extension

Several test pieces were cut out of the tread of each sample tire. The hardness was measured by using a hardness tester specified by JIS (Japanese Industrial Standard) and the tensile stress at 50% extension was measured in accordance with JIS K6301.

REFERENCES "I" & "II", EXAMPLES "I", "II", "III", "IV" & V

Seven kinds of sample tires were produced by using the rubber compositions "N-1" to "N-7" shown in TABLE 1. As will be understood from TABLE 2, the tires produced by these rubber compositions are denoted respectively by REFERENCES "I" & "II" and EXAMPLES "I", "II", "III", "IV" & "V". Of course, these sample tires were identical in construction except the differences in the materials of the tread. The tires were subjected to some of the afore-mentioned evaluation tests. The results are shown in TABLE 2.

TABLE 2

| Sample tire | Reference I | Reference II | Example I | Example II | Example III | Example IV | Example V |
|---|---|---|---|---|---|---|---|
| No. of Tread Rubber Composition | N-1 | N-2 | N-3 | N-4 | N-5 | N-6 | N-7 |
| Property of Tread Rubber | | | | | | | |
| Mean Cell Diameter (μM) | 24 | 25 | 24 | 25 | 36 | 64 | 58 |
| Expansion Ratio (%) | 2 | 5 | 12 | 17 | 20 | 30 | 28 |
| Number of Closed Cells having diameters of 30 to 200 μm (N/mm²) | 3 | 12 | 50 | 64 | 74 | 102 | 92 |
| Friction Coefficient to Iced Road | 0.016 | 0.020 | 0.037 | 0.049 | 0.051 | 0.056 | 0.055 |
| Performance of Tire | | | | | | | |
| Heat generation in Tread (°C.) | 59 | 64 | 59 | 62 | 61 | 60 | 60 |
| Wear Resistance*1 | 100 | 96 | 90 | 87 | 85 | 80 | 94 |
| Braking Ability on Iced Road*2 | 100 | 100 | 95 | 92 | 91 | 85 | 85 |

*1: The larger the index, the better the tire.
*2: The smaller the index, the better the tire.

Figure 2:
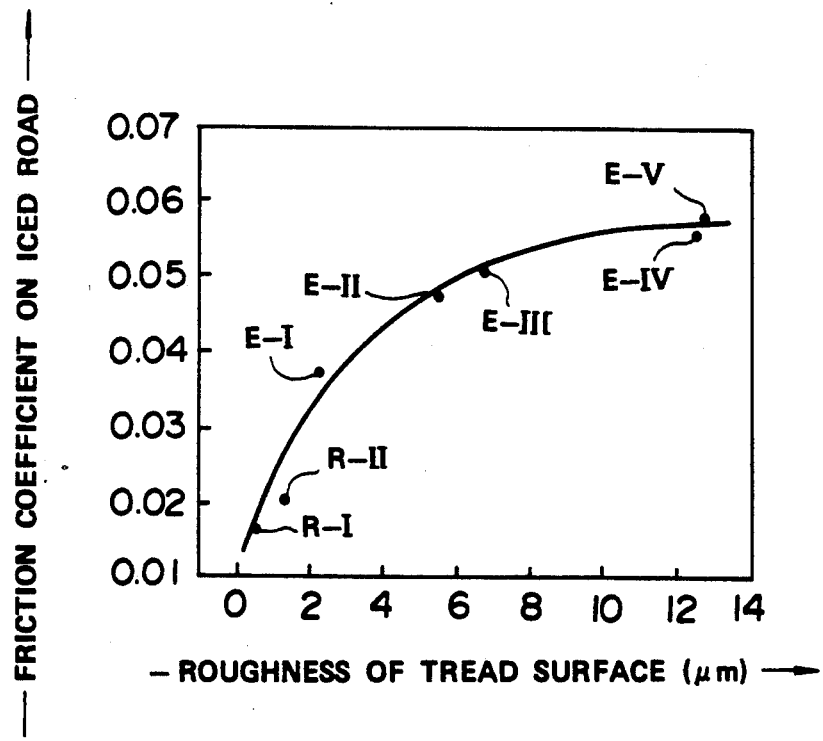
FIG. 2 is a graph showing a friction coefficient of the tire tread on an iced road surface with respect to roughness of tread surface.

As will be seen from TABLE 2, in the Reference "I" and Reference "II" respectively produced from the rubber compositions "N-1" and "N-2", the number of closed cells of diameters of about 30 μm to 200 μm per unit area of 1 mm² was less than 20. These References "I" and "II" were those which failed to have sufficient roughness of the tread surface. While, in the Examples "I", "II", "III", "IV" and "V", the number of closed cells of the given diameter range was larger than 50. The heat generation in tread of the Examples "I" to "V" was substantially equal to that of the References "I" and "II". Although, the wear resistance of the Examples "I" to "V" was somewhat inferior to that of the References "I" and "II", the braking ability on iced road of the Examples was superior to that of the References "I" and "II". The superiority in the braking ability of the Examples "I" to "V" will be easily understood from the graph of FIG. 2 which plots the friction coefficients on iced road of the References "I" & "II" and the Examples "I", "II", "III", "IV" & "V" with respect to the roughness of the tread surface.

REFERENCES "C", "D" & "E", EXAMPLES "VI", "VII" & "VIII"

Six kinds of sample tires were further produced by using the rubber compositions "N-8" to "N-13" shown in TABLE 3. As will be seen from TABLE 4, the tires produced by these compositions are denoted respectively by Examples "VI", "VII" & "VIII" and References "III", "IV" & "V". It is to be noted that the rubber compositions "N-11", "N-12" and "N-13" for References "III", "IV" & "V" had no blowing agents therein. These six sample tires were subjected to some of the above-mentioned evaluation tests. The results are shown in TABLE 4.

TABLE 3

| No. of Tread Rubber Composition | (parts by weight) | | | | | |
|---|---|---|---|---|---|---|
| | N-8 | N-9 | N-10 | N-11 | N-12 | N-13 |
| Natural Rubber (glass transition point = -72° C.) | 60 | 60 | 70 | 60 | 60 | 60 |
| Polybutadiene Rubber (glass transition point = -100° C.) | 40 | 40 | 30 | 40 | 40 | 40 |
| Carbon Black | 70 | 70 | 60 | 70 | 60 | 45 |
| Process Oil | 30 | 30 | 15 | 30 | 30 | 30 |
| Wax | 2.0 | 2.0 | 2.0 | 2.0 | 2.0 | 2.0 |
| Stearic Acid | 3.0 | 3.0 | 3.0 | 3.0 | 3.0 | 3.0 |
| Antioxidant | 1.0 | 1.0 | 1.0 | 1.0 | 1.0 | 1.0 |
| Zinc Oxide | 3.0 | 3.0 | 3.0 | 3.0 | 3.0 | 3.0 |
| Vulcanization Accelerator | 1.0 | 1.0 | 1.0 | 1.0 | 1.0 | 1.0 |
| Sulfer | 1.8 | 1.8 | 1.8 | 1.8 | 1.8 | 1.8 |
| Blowing Agent | | | | | | |
| Dinitroso-Pentamethylene-Tetramine | 2.0 | 2.5 | 2.5 | 0 | 0 | 0 |
| Urea | 1.0 | 2.5 | 2.5 | 0 | 0 | 0 |

"VII" & "VIII" and References "III", "IV" & "V". That is, FIG. 3 plots the friction coefficients of them with respect to the kinetic elastic modulus, while FIG. 4 plots the same with respect to the expansion ratio. As will be seen from these graphs, the Examples "VI", "VII" and "VIII" were superior in the friction coefficient and braking ability on iced road to the References "III", "IV" & "V", and were substantially equal in the controllability and stability to the References.

REFERENCES "IV" to "XIII" and EXAMPLES "IX" to "XIII"

Figure 5:
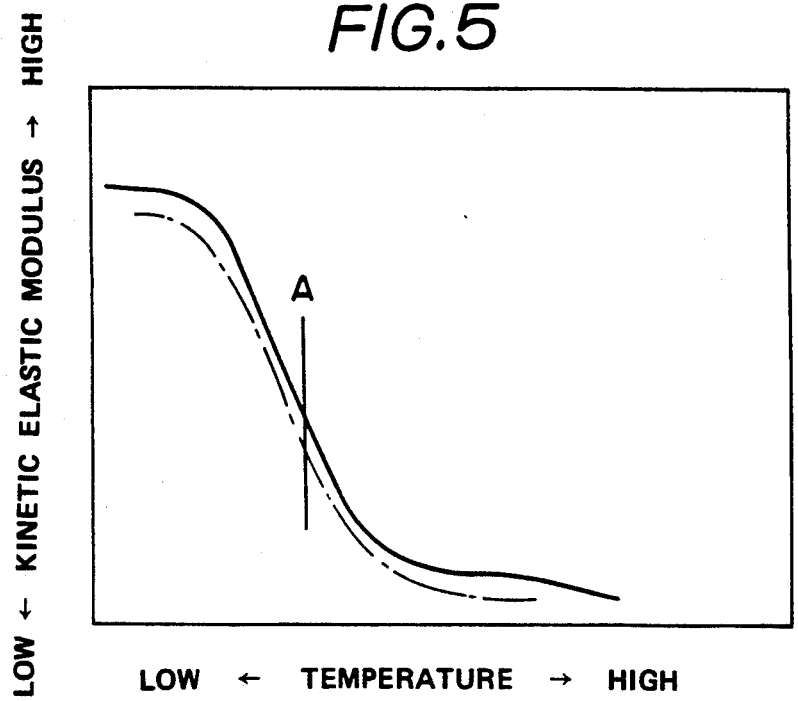
FIG. 5 is a graph showing effect of a softening agent to the kinetic elastic modulus of the tread.
Figure 6:
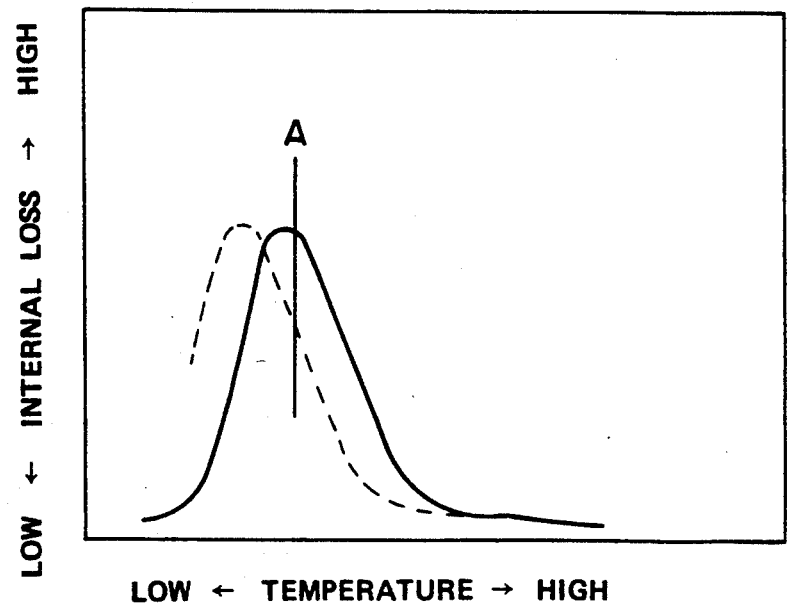
FIG. 6 is a graph showing effect of the softening agent to internal loss of the tread.
Figure 9:
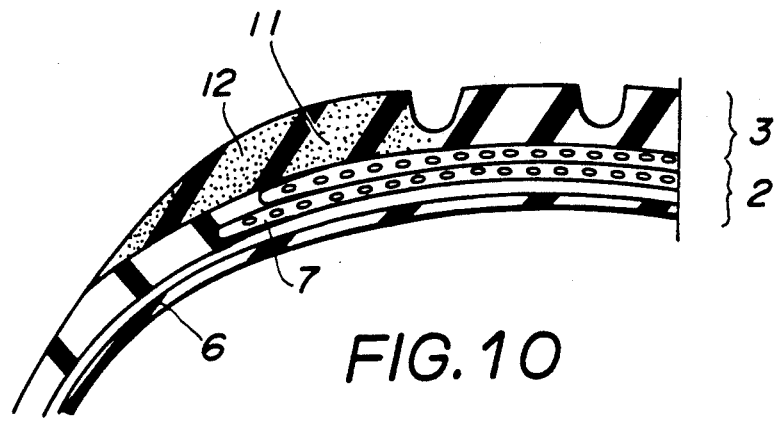
FIGS. 9, 10 and 11 are partial and sectional view of three types of treads to which foamed rubber parts are partially applied in various manner.
Figure 10:
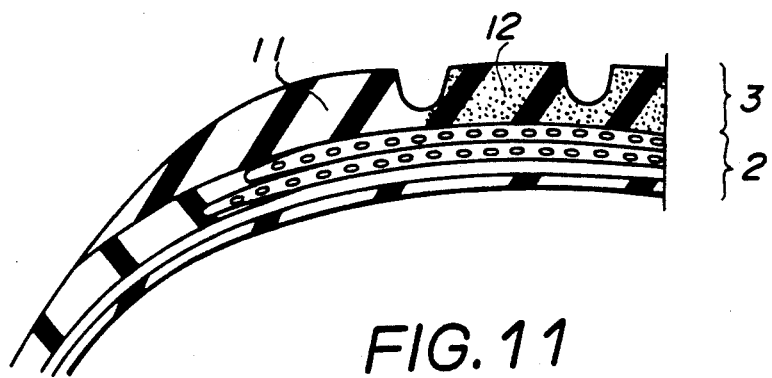
Figure 11:
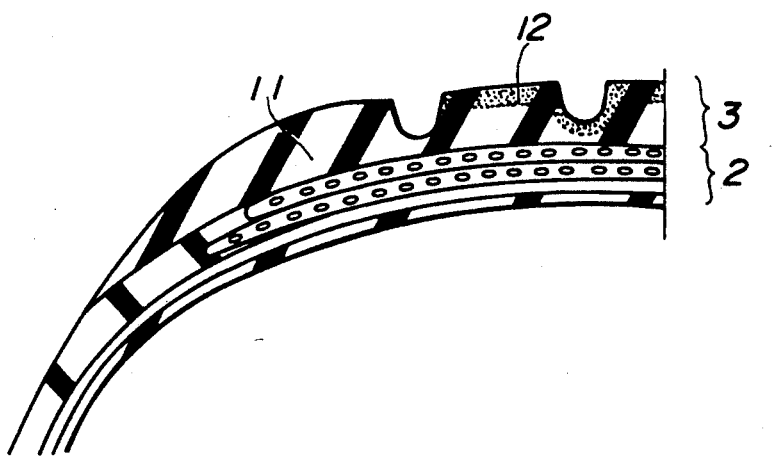

In addition to the above-mentioned facts, the applicants have discovered that addition of softening agent to the rubber composition brings about improvement in both the kinetic elastic modulus and the internal loss thereby improving the performance of tire relative to wet-iced road surface. This will be understood from the graphs of FIGS. 5 and 6 which respectively plot the kinetic elastic modulus and the internal loss of tread samples with respect to the ambient temperature. The solid line in FIG. 5 shows the kinetic elastic modulus of a usual tread rubber produced from a rubber composition which has no blowing agent nor softening agent therein. It has been revealed that a tread rubber produced from a rubber composition which contains therein a small amount of softening agent shows a kinetic elastic modulus very similar to that of the usual tread rubber. The dot-dash line in FIG. 5 shows the kinetic elastic modulus of a foamed tread rubber produced from a rubber composition which contains a blowing agent but no softening agent. From these facts, it will be understood that the curved line of the kinetic elastic modulus of a foamed tread rubber is shifted downward in the graph of FIG. 5. The solid line in FIG. 6 shows the internal loss of the usual tread rubber. It has been also revealed that a foamed tread rubber shows an internal loss very similar to that of the usual tread rubber. The broken line in FIG. 6 shows the internal loss of a tread rubber produced from a rubber composition which contains therein a softening agent but no blowing agent. From these facts, it will be understood that the curved line of the internal loss of a tread rubber containing therein a softening agent is shifted to the left in the graph of FIG. 6. Thus, at the temperature indicated by the arrow "A", the foamed tread rubber has a

TABLE 4

| Sample tire | Example VI | Example VII | Example VIII | Reference III | Reference IV | Reference V |
|---|---|---|---|---|---|---|
| No. of Tread Rubber Composition | N-8 | N-9 | N-10 | N-11 | N-12 | N-13 |
| Property of Tread Rubber | | | | | | |
| Mean Cell Diameter (μm) | 42 | 30 | 34 | 0 | 0 | 0 |
| Expansion Ratio (%) | 15 | 20 | 22 | 0 | 0 | 0 |
| Number of Closed Cells having diameters of 30 to 200 μm (N/mm$^2$) | 76 | 128 | 89 | 0 | 0 | 0 |
| Kinetic Elastic Modulus (× 10$^7$ dyne/cm$^2$) | 6.2 | 3.8 | 7.9 | 6.2 | 4.8 | 3.2 |
| Friction Coefficient to Iced Road | 0.036 | 0.038 | 0.042 | 0.020 | 0.024 | 0.029 |
| Performance of tire | | | | | | |
| Braking Ability*3 on Iced Road | 93 | 88 | 89 | 100 | 98 | 94 |
| Controllability and Stability on Paved Dry Road | 0 | -1.5 | +1.5 | 0 (Control) | -1 | -2.5 |

*3: Index on the base of 100 for REFERENCE "III" (smaller index implies a better tire in the ability)

FIGS. 3 and 4 are graphs which show the friction coefficients of the six sample tires, viz., Examples "VI", reduced kinetic elastic modulus and an increased internal loss as compared with a tread rubber which contains a softening agent. Thus, the foamed tread rubber is superior in friction to wet-iced road surface. The tread rubber containing a softening agent has an increased kinetic elastic modulus and a reduced internal loss as compared with a foamed tread rubber. Thus, the tread rubber containing the softening agent is superior in wear resistance. Thus, it will be appreciated that a foamed tread rubber which contains both the blowing agent and the softening agent is superior in both the friction to the wet-iced road surface and the wear resistance.

This will become clear from the following description.

Thirteen kinds of sample tires were produced by using the rubber compositions "N-14" to "N-26" shown in TABLE 5. It is to be noted that the rubber compositions "N-14" and "N-15" have no blowing agent contained therein, and the amount of blowing agent is gradually increased in order from the rubber composition "N-16" to the rubber composition "N-26". The rubber compositions "N-14", "N-15", "N-17", "N-19", "N-21", "N-23" and "N-25" contain different amounts of softening agent, while, the other rubber compositions "N-16", "N-18", "N-20", "N-22", "N-24" and "N-26" contain no softening agent for the purpose of comparison with those containing the softening agent. These thirteen kinds of sample tires were subjected to some of the afore-mentioned evaluation tests. The results are shown in TABLE 6.

TABLE 5

| Sample Tire | R-VI | R-VII | R-VIII | E-IX | R-IX | E-X | R-X | E-XI | R-XI | E-XII | R-XII | E-XIII | R-XIII |
|---|---|---|---|---|---|---|---|---|---|---|---|---|---|
| No. of Tread Rubber Composition | N-14 | N-15 | N-16 | N-17 | N-18 | N-19 | N-20 | N-21 | N-22 | N-23 | N-24 | N-25 | N-26 |
| Natural Rubber (G.T.P. = $-72°$ C.) | 70 | 70 | 70 | 70 | 70 | 70 | 70 | 70 | 70 | 70 | 70 | 70 | 70 |
| Polybutadiene Rubber (G.T.P. = $-100°$ C.) | 30 | 30 | 30 | 30 | 30 | 30 | 30 | 30 | 30 | 30 | 30 | 30 | 30 |
| Carbon Black | 80 | 80 | 80 | 80 | 80 | 80 | 80 | 80 | 80 | 80 | 80 | 80 | 80 |
| Process Oil | 40 | 40 | 40 | 40 | 40 | 40 | 40 | 40 | 40 | 40 | 40 | 40 | 40 |
| Wax | 1 | 1 | 1 | 1 | 1 | 1 | 1 | 1 | 1 | 1 | 1 | 1 | 1 |
| Stearic Acid | 3 | 3 | 3 | 3 | 3 | 3 | 3 | 3 | 3 | 3 | 3 | 3 | 3 |
| Antioxidant | 1 | 1 | 1 | 1 | 1 | 1 | 1 | 1 | 1 | 1 | 1 | 1 | 1 |
| Zinc Oxide | 3 | 3 | 3 | 3 | 3 | 3 | 3 | 3 | 3 | 3 | 3 | 3 | 3 |
| Vulcanization Accelerator | 1.0 | 1.0 | 1.0 | 1.0 | 1.0 | 1.0 | 1.0 | 1.0 | 1.0 | 1.0 | 1.0 | 1.0 | 1.0 |
| Sulfer | 2.0 | 2.0 | 2.0 | 2.0 | 2.0 | 2.0 | 2.0 | 2.0 | 2.0 | 2.0 | 2.0 | 2.0 | 2.0 |
| Blowing Agent | | | | | | | | | | | | | |
| Dinitroso-Pentamethylene Tetramine | 0 | 0 | 1.5 | 1.5 | 2.0 | 2.0 | 2.5 | 2.5 | 3.2 | 3.2 | 3.8 | 3.8 | 4.5 |
| Urea | 0 | 0 | 1.5 | 1.5 | 2.0 | 2.0 | 2.0 | 2.5 | 3.2 | 3.2 | 3.8 | 3.8 | 4.5 |
| Softening Agent (Dioctylsebacate) | 10 | 20 | 0 | 10 | 0 | 5 | 0 | 5 | 0 | 5 | 0 | 2 | 0 |

TABLE 6

| Sample Tire | R-VI | R-VII | R-VIII | E-IX | R-IX | E-X | R-X | E-XI | R-XI | E-XII | R-XII | E-XIII | R-XIII |
|---|---|---|---|---|---|---|---|---|---|---|---|---|---|
| No. of Tread Rubber Composition | N-14 | N-15 | N-16 | N-17 | N-18 | N-19 | N-20 | N-21 | N-22 | N-23 | N-24 | N-25 | N-26 |
| Property of Trend Rubber | | | | | | | | | | | | | |
| Mean Cell Diameter ($\mu$m) | 0 | 0 | 25 | 30 | 35 | 35 | 27 | 34 | 35 | 38 | 47 | 55 | 104 |
| Expansion Ratio (%) | 0 | 0 | 5 | 5 | 10 | 10 | 20 | 20 | 40 | 40 | 50 | 50 | 60 |
| Number of Closed Cells of Diameters of 30 to 200 $\mu$m (N/mm$^2$) | 0 | 0 | 28 | 32 | 40 | 55 | 107 | 87 | 128 | 120 | 47 | 45 | 31 |
| Hardness (JIS. 0° C.) | 54 | 47 | 58 | 51 | 53 | 50 | 49 | 47 | 42 | 40 | 37 | 35 | 31 |
| Hardness Change (by JIS K6301) | +4 | +6 | ±0 | +4 | ±0 | +2 | ±0 | +2 | ±0 | +2 | ±0 | +1 | ±0 |
| Wear Resistance*4 | 100 | 85 | 108 | 92 | 98 | 92 | 85 | 82 | 71 | 68 | 62 | 60 | 54 |
| Performance of Tire | | | | | | | | | | | | | |
| Braking Ability on Iced Road (about 0° C.) | 100 | 95 | 104 | 98 | 97 | 94 | 90 | 88 | 84 | 83 | 80 | 80 | 78 |
| Braking Ability on Iced Road (about $-20°$ C.) | 100 | 94 | 105 | 99 | 99 | 97 | 95 | 94 | 100 | 99 | 105 | 104 | 110 |

*4: Tested by Rubber Abrasion Tester (slip rate: 25%)

As is understood from TABLE 6, the Examples "IX" to "XIII" which contain the softening agent are superior in both the wear resistance and the braking ability on iced road to the References "VI" to "XIII".

REFERENCES "XIV" to "XVII" and EXAMPLES "XIV" to "XVIII"

The applicants have further discovered that addition of short fiber to the rubber composition improves the performance of the tire. In this connection, nine kinds of sample tires were produced by using the rubber compositions "N-27" to "N-35" shown in TABLE 7. The short fiber used was aramido short fiber having a mean length of 5 $\mu$m and a mean diameter of 0.2 $\mu$m. Inspection by microphotographs revealed that the short fibe was arranged randomly about the closed cells of the foamed tread rubber. These sample tires were subjected to some of the afore-mentioned evaluation tests. The results are shown in TABLE 8.

TABLE 9 for the purpose of studying the advantages given by addition of several kinds of short fiber. As the

TABLE 7

| | (parts by weight) | | | | | | | | |
|---|---|---|---|---|---|---|---|---|---|
| Sample Tire | E-XIV | E-XV | E-XVI | E-XVII | E-XVIII | R-XIV | R-XV | R-XVI | R-XVII |
| No. of Tread rubber Composition | N-27 | N-28 | N-29 | N-30 | N-31 | N-32 | N-33 | N-34 | N-35 |
| Natural Rubber (G.T.P. = −72° C.) | 70 | 70 | 70 | 70 | 70 | 70 | 70 | 70 | 70 |
| Polybutadiene Rubber (G.T.P. = −100° C.) | 30 | 30 | 30 | 30 | 30 | 30 | 30 | 30 | 30 |
| Carbon Black | 75 | 75 | 75 | 75 | 75 | 75 | 75 | 75 | 75 |
| Process Oil | 30 | 30 | 30 | 30 | 30 | 30 | 30 | 30 | 30 |
| Wax | 1 | 1 | 1 | 1 | 1 | 1 | 1 | 1 | 1 |
| Stearic Acid | 3 | 3 | 3 | 3 | 3 | 3 | 3 | 3 | 3 |
| Antioxidant | 1 | 1 | 1 | 1 | 1 | 1 | 1 | 1 | 1 |
| Zinc Oxide | 3 | 3 | 3 | 3 | 3 | 3 | 3 | 3 | 3 |
| Vulcanization Accelerator | 1 | 1 | 1 | 1 | 1.5 | 1 | 1 | 1 | 1 |
| Sulfer | 1.8 | 1.8 | 1.8 | 2.0 | 1.8 | 1.8 | 1.8 | 1.8 | 1.8 |
| Blowing Agent | | | | | | | | | |
| Dinitroso-Pentamethylene Tetramine | 2.0 | 2.5 | 2.5 | 3.0 | 0 | 0 | 1.5 | 0 | 4.5 |
| Urea | 2.0 | 2.5 | 2.5 | 3.0 | 0 | 0 | 1.5 | 0 | 4.5 |
| Azodicarbon-amido | 0 | 0 | 5 | 5 | 3.0 | 0 | 0 | 0 | 0 |
| Short Fiber | 5 | 5 | 5 | 5 | 2 | 0 | 0.5 | 0 | 0 |

TABLE 8

| Sample Tire | E-XIV | E-XV | E-XVI | E-XVII | E-XVIII | R-XIV | R-XV | R-XVI | R-XVII |
|---|---|---|---|---|---|---|---|---|---|
| No. of Tread Rubber Composition | N-27 | N-28 | N-29 | N-30 | N-31 | N-32 | N-33 | N-34 | N-35 |
| Property of Tread Rubber | | | | | | | | | |
| Expansion Ratio (%) | 10 | 20 | 20 | 25 | 20 | 0 | 4.8 | 0 | 55 |
| Hardness (JIS) | 56 | 53 | 54 | 54 | 52 | 58 | 57 | 42 | 38 |
| Tensile Stress at 50% extension (kg/cm$^2$) | 10.8 | 9.2 | 9.8 | 9.6 | 7.6 | 8.1 | 8.1 | 5.8 | 6.0 |
| Performance of Tire | | | | | | | | | |
| Controllability & Stability on Paved Dry Road | +2.0 | +1.0 | +1.5 | +0.5 | +0.5 | (Control) ±0 | −3.0 | −3.0 | |
| Ride Comfort | −1.0 | +0.5 | +0.5 | ±0 | +1.5 | (Control) ±0 | +1.0 | +1.0 | |
| Braking ability*5 on Iced Road | 90 | 84 | 86 | 83 | 91 | 100 | 99 | 92 | 85 |

*5: Index on the base of 100 for Reference-XIV (smaller Index implies a better tire in the ability)

As is seen from the result of the Reference-XV of Table 8, addition of 0.5 parts by weight of the short fiber did not induce sufficient braking ability on iced road. Further, as is seen from the result of the Reference-XVI, the tread with a reduced amount of carbon black was inferior in the Controllability and stability on Paved Dry Road. Furthermore, as is seen from the result of the Reference-XVII, the largely foamed tread rubber was inferior in both the Controllability and Stability. The Examples "XIV" to "XVII" had each a sufficient braking ability on iced road irrespective of the reduced expansion ratio thereof.

REFERENCES "XVIII" to "XXI" and EXAMPLES "XIX" to "XXII"

Eight sample tires were further produced by using the rubber compositions "N-36" to "N-43" shown in short fiber, aramido short fiber of mean length of 5 μm and mean diameter of 0.2 μm, nylon short fiber of mean length of 10 μm and mean diameter of 0.4 μm and short fiber of syndiotactic 1.2-polybutadiene of mean length of 3 μm and mean diameter of 0.2 μm were used. It is to be noted that the rubber compositions (for example, the compositions "N-36" and "N-37") described in adjacent two columns have the same contents except the amount of the short fiber. These sample tires were subjected to some of the afore-mentioned evaluation tests. The results are shown in TABLE 10.

As is seen from TABLE 10, the Example-XIX was superior in the Wear Resistance and the Friction Coefficient on iced road to its competitor, viz., the Reference "XVIII", and the Example "XX" was superior in the Friction on the paved wet road to its competitor, viz., the Reference "XIV".

TABLE 9

| | (parts by weight) | | | | | | | |
|---|---|---|---|---|---|---|---|---|
| Sample Tire | R-XVIII | E-XIX | R-XIX | E-XX | R-XX | E-XXI | R-XXI | E-XXII |
| No. of Tread rubber Composition | N-36 | N-37 | N-38 | N-39 | N-40 | N-41 | N-42 | N-43 |
| Natural Rubber (G.T.P. = −72° C.) | 70 | 70 | 0 | 0 | 40 | 40 | 40 | 40 |
| Polybutadiene Rubber (G.T.P. = −100° C.) | 30 | 30 | 0 | 0 | 60 | 60 | 60 | 60 |

TABLE 9-continued

| Sample Tire | (parts by weight) | | | | | | | |
|---|---|---|---|---|---|---|---|---|
| | R-XVIII | E-XIX | R-XIX | E-XX | R-XX | E-XXI | R-XXI | E-XXII |
| Styrene-Butadiene Rubber (G.T.P. = −50° C.) | 0 | 0 | 100 | 100 | 0 | 0 | 0 | 0 |
| Carbon Black | 50 | 50 | 65 | 65 | 50 | 40 | 50 | 50 |
| Stearic Acid | 2 | 2 | 2 | 2 | 2 | 2 | 2 | 2 |
| Zinc Oxide | 3.5 | 3.5 | 3 | 3 | 3 | 3 | 3 | 3 |
| Vulcanization Accelerator | 0.6 | 0.6 | 0.6 | 0.6 | 0.5 | 0.5 | 0.5 | 0.5 |
| Sulfer | 1.5 | 1.5 | 1.5 | 1.5 | 1.5 | 1.5 | 1.5 | 1.5 |
| Blowing Agent | | | | | | | | |
| Dinitroso-Pentamethylene Tetramine | 2.5 | 2.5 | 2.5 | 2.5 | 2.5 | 2.5 | 2.5 | 2.5 |
| Urea | 2.5 | 2.5 | 2.5 | 2.5 | 2.5 | 2.5 | 2.5 | 2.5 |
| | | *6 | *7 | *7 | *8 | *8 | *7 | *7 |
| Short Fiber | 0 | 5 | 0 | 4 | 0 | 5 | 0 | 20 |

*6: Short Fiber (mean length: 5 μm, mean diameter: 0.2 μm)
*7: Nylon Short Fiber (mean length: 10 μm, mean diameter: 0.4 μm)
*8: Short Fiber of syndiotactic 1, 2-polybutadiene (mean length: 3 μm, mean diameter: 0.2 μm)

TABLE 10

| Sample Tire | R-XVIII | E-XIX | R-XIX | E-XX | R-XX | E-XXI | R-XXI | E-XXII |
|---|---|---|---|---|---|---|---|---|
| No. of Tread rubber Composition | N-36 | N-37 | N-38 | N-39 | N-40 | N-41 | N-42 | N-43 |
| Mean Cell Diameter (μm) | 25 | 31 | 32 | 40 | 20 | 30 | 20 | 30 |
| Expansion Ratio (%) | 22 | 22 | 20 | 20 | 20 | 22 | 22 | 23 |
| Number of Closed Cells of Diameters of 30 to 200 μm (N/mm$^2$) | 91 | 70 | 67 | 59 | 91 | 70 | 91 | 79 |
| Hardness (JIS) | 47 | 52 | 60 | 62 | 47 | 48 | 47 | 57 |
| Tensile Stress at 50% Extension (kg/cm$^2$) | 8.8 | 11.9 | 10 | 14 | 7 | 10 | 7 | 12 |
| Resilience | — | — | 41 | 37 | 61 | 54 | 61 | 58 |
| Wear Resistance*9 (Index) | 100 | 110 | — | — | — | — | — | — |
| Friction Coefficient on Iced Road | 0.045 | 0.052 | — | — | — | — | — | — |
| Braking Ability on*10 Paved Wet Road (Index) | — | — | 100 | 90 | — | — | — | — |
| Compression Stress at 10%*11 Compression (kg/cm$^2$) | — | — | — | — | — | — | 2 | 5 |

*9: The test was carried out by using an abrasion tester specified by ASTM D2228, and the results were converted to index on the base of 100 for Reference-XVIII.
*10: Sample tires connected to a 1500 cc motor vehicle were run on a paved wet road at a speed of about 50 km/hr, and the braking distance was measured. The results were converted to index on the base of 100 for Reference-XIX.
*11: The test was carried out by using a compression tester specified by JIS K6301.

MODIFIED SHAPE OF TREAD

Referring to FIG. 7, there is shown but partially a pneumatic tire which has a double-layered tread 3 disposed on the crown portion 2a of the case 2, which tire is constructed also in accordance with the present invention. That is, the tread 3 comprises a foamed outer layer 3a and a solid inner layer 3b. In the tread 3 shown in FIG. 7, the foamed outer layer 3a has a hardness of 47 degrees by JIS and an expansion ratio of 22%, and the solid inner layer 3b has a hardness of 60 degrees by JIS. For the purpose of examining the performance of the tires having the double-layered tread, several sample tires were produced by using the rubber composition shown in TABLE 11. The sample tires were subjected to some of the afore-mentioned evaluation tests. The results are shown in TABLE 12.

TABLE 11

| No. of Tread Rubber | (parts by weight) | |
|---|---|---|
| | N-44 | 0.2–4.5 |
| Natural Rubber (G.T.P. = −72° C.) | 60 | 60 |
| Polybutadiene Rubber (G.T.P. = −100° C.) | 40 | 40 |
| Stylenebutadiene Rubber (G.T.P. = −50° C.) | — | — |
| Carbon Black | 70 | 70 |
| Process Oil | 30 | 30 |
| Wax | 1.0 | 1.0 |
| Stearic Acid | 2.0 | 2.0 |
| Antioxidant | 1.5 | 1.5 |
| Zinc Oxide | 3.0 | 3.0 |
| Vulcanization Accelerator | 1.5 | 1.5 |
| Sulfer | 1.5 | 1.5 |
| Blowing Agent | | |
| Dinitroso-Pentamethylene Tetramine | 0 | 0.2–4.5 |

TABLE 12

| Sample Tire | (parts by weight) | | | | |
|---|---|---|---|---|---|
| | R-XXII | E-XXIII | E-XXIV | E-XXV | E-XXVI |
| No. of Tread rubber composition | N-44 | N-45 | N-45 | N-45 | N-45 |
| Property of Tread Rubber | | | | | |
| State of Tread | Entirely Solid | Entirely Solid | Entirely Foamed | Double-Layered | Double-Layered |
| Rate of Volume of Foamed Layer to Tread (%) | 0 | 100 | 100 | 55 | 55 |
| Mean Cell Diameter ($\mu$m) | 0 | 32 | 65 | 32 | 65 |
| Number of Closed Cells of Diameters of 30 to 200 $\mu$m (N/mm$^2$) | 0 | 90 | 52 | 90 | 52 |
| Expansion Ratio (%) | 0 | 22 | 45 | 22 | 45 |
| Hardness (JIS) | 53 | 47 | 45 | 47 | 45 |
| Performance of Tire | | | | | |
| Heat Generation in Tread (°C.) | 61 | 64 | 65 | 63 | 64 |
| Wear Resistance*12 (Index) | 100 | 90 | 83 | 91 | 85 |
| Braking Ability*13 on Iced Road (Index) | 100 | 85 | 80 | 87 | 84 |

*12: Smaller Index implies a better tire in the ability.
*13: Smaller Index implies a better tire in the ability.

It is to be noted that the Examples "XXV" and "XXVI" are of the type which has a double layered tread. The Reference "XXII" and the Examples "XXIII" and "XXIV" are the tires which were prepared for making physical comparison with the Examples "XXV" and "XXVI". As is understood from TABLE 12, the Wear Resistance and the Braking Ability on Iced Road of the double layered tread (viz., the Examples "XXV" and "XXVI") are substantially the same as those of the entirely foamed tread (viz., the Examples "XXIII" and "XXIV"), and the heat generation of the double layered tread is less than the entirely foamed one. Because of provision of both the foamed tread layer and the solid tread layer, advantageous properties of them are commonly possessed by the double layered tread. That is, because of the foamed outer layer, sufficient flexibility of the tread is ensured even in running on iced road thereby assuring the snow gripping ability of the associated tire. Furthermore, because of the provision of the solid inner layer which has a sufficient rigidity, the resistance of the associated tire against a side force which develops in the direction normal to the side surface of the tire is increased thereby ensuring the controllability of the tire. It is to be noted that the rigidity of the inner solid layer controls or restricts the movement of the foamed outer layer disposed thereon. This induces improvement in wear resistance of the tread to the road surface.

What is claimed is:

1. A pneumatic tire comprising:
   a case having a crown portion; and
   a tread covering said crown portion of the case, said tread including as an outer surface portion a foamed rubber which has a volume not less than approximately 10% and not more than approximately 70% of that of the entire of said tread, said foamed rubber being formed of a rubber composition which contains rubber components each having a glass transition point not higher than −60° C., and which additionally contains process oil,
   wherein said foamed rubber has an expansion ratio ranging from approximately 5% to approximately 50%, has closed cells the mean diameter of which ranges from approximately 5 $\mu$m to approximately 150 $\mu$m, and has not less than 20 closed cells of diameters from approximately 30 $\mu$m to approximately 200 $\mu$m per 1 mm$^2$.

2. A pneumatic tire as claimed in claim 1, in which said foamed rubber has a kinetic elastic modulus ranging from $3 \times 10^7$ dyne/cm$^2$ to $13 \times 10^7$ dyne/cm$^2$.

3. A pneumatic tire as claimed in claim 1, in which the volume of said foamed rubber is about 40% to 70% of that of the entire of said tread.

4. A pneumatic tire as claimed in claim 1, in which the expansion ratio of the foamed rubber is about 5% to 30%.

5. A pneumatic tire as claimed in claim 1, in which said tread comprises a foamed rubber outer layer and a solid rubber inner layer, said solid rubber inner layer having a hardness not less than 50 degrees specified by JIS.

6. A pneumatic tire as claimed in claim 1, in which said foamed rubber is applied to only a center portion of the tread.

7. A pneumatic tire as claimed in claim 1, in which said foamed rubber is partially applied to the tread.

8. A pneumatic tire as claimed in claim 1, in which said rubber composition further comprises short fiber.

9. A pneumatic tire as claimed in claim 8, wherein the short fiber has a mean length of about 10 $\mu$m to about 500 $\mu$m and has a length about 10 to 100 times as long as the diameter of the short fiber.

10. A pneumatic tire as claimed in claim 1, wherein the rubber composition of the tread contains process oil in an amount of 15% to 40% by weight of process oil per 100 parts by weight of the rubber components.

11. A pneumatic tire as claimed in claim 1, wherein said rubber composition of said tread contains at least 20% cis-1,4-polybutadiene rubber by weight.

12. A pneumatic tire as claimed in claim 1, wherein the mean cell diameter of the closed cells in the foamed rubber is about 10 $\mu$m to 100 $\mu$m.

13. A pneumatic tire as claimed in claim 1, wherein the foamed rubber has at least 30 closed cells of diameters from approximately 30 $\mu$m to approximately 200 $\mu$m.

14. A pneumatic tire as claimed in claim 1, wherein the foamed rubber comprises from 2 to 20 parts by weight of low temperature softening agent per 100 parts by weight of the rubber components, said softening agent having a freezing point not higher than −40° C.

15. A pneumatic tire as claimed in claim 1, wherein the rubber composition contains not more than 40 parts by weight of process oil per 100 parts by weight of the rubber components.

16. A pneumatic tire comprising:
a case having a crown portion; and
a tread covering said crown portion of the case, said tread including as an outer surface portion a foamed rubber which has a volume not less than approximately 10% and not more than approximately 70% of that of the entire of said tread, said foamed rubber being formed of a rubber composition which contains rubber components each having a glass transition point not higher than −60° C., and not more than 40 parts by weight of process oil per 100 parts by weight of the rubber components, wherein said foamed rubber has an expansion ratio ranging from approximately 5% to approximately 50%, has closed cells the mean diameter of which ranges from approximately 5 μm to approximately 150 μm, and has not less than 20 closed cells of diameters from approximately 30 μm to approximately 200 μm per 1 mm$^2$.

17. A pneumatic tire as claimed in claim 16, in which said rubber composition contains 2 to 20 parts by weight of softening agent on the base of 100 parts by weight of the rubber components.

* * * * *